(12) United States Patent
Fan et al.

(10) Patent No.: US 11,892,064 B2
(45) Date of Patent: Feb. 6, 2024

(54) DISCONNECTING DIFFERENTIAL AND ELECTRIC DRIVE TRANSMISSION SYSTEM HAVING THE SAME

(71) Applicant: XPT EDS (Hefei) Co., Ltd., Hefei (CN)

(72) Inventors: Xin Fan, Shanghai (CN); Zhengcheng Huang, Shanghai (CN)

(73) Assignee: XPT EDS (Hefei) Co., Ltd., Hefei (CN)

( * ) Notice: Subject to any disclaimer, the term of this patent is extended or adjusted under 35 U.S.C. 154(b) by 0 days.

(21) Appl. No.: 18/189,585

(22) Filed: Mar. 24, 2023

(65) Prior Publication Data

US 2023/0304566 A1    Sep. 28, 2023

(30) Foreign Application Priority Data

Mar. 25, 2022    (CN) .......................... 202210307615.3

(51) Int. Cl.
   *F16H 48/06* (2006.01)
   *F16H 48/40* (2012.01)
   *F16H 57/00* (2012.01)

(52) U.S. Cl.
   CPC ............. *F16H 48/06* (2013.01); *F16H 48/40* (2013.01); *F16H 57/0006* (2013.01)

(58) Field of Classification Search
   CPC .......... F16H 48/06; F16H 48/40; F16H 48/34; F16H 2048/202; F16H 57/0006
   See application file for complete search history.

(56) References Cited

U.S. PATENT DOCUMENTS

| | | | | |
|---|---|---|---|---|
| 5,971,123 | A | * 10/1999 | Ochab | F16D 41/064 192/84.21 |
| 6,629,590 | B2 | * 10/2003 | Ochab | B60K 23/06 384/526 |
| 8,840,514 | B1 | * 9/2014 | Knickerbocker | B60K 17/26 475/220 |

* cited by examiner

*Primary Examiner* — Huan Le
(74) *Attorney, Agent, or Firm* — Sheridan Ross P.C.

(57) ABSTRACT

An electric drive transmission system includes a disconnecting differential. The disconnecting differential comprises a first one-way clutch, a second one-way clutch and an interruption device. The first one-way clutch and the second one-way clutch have opposite locking directions and are coaxially sleeved between a planet carrier and a differential housing. The interruption device comprises a power section and an interruption section, wherein the power section is located on an inner wall of a reduction gearbox, and wherein the interruption section is located on the differential housing and can shift, under the action of the power section, all rolling elements of the one-way clutch locked in a forward rotation coasting condition, thereby realizing selective releasing of the locking function of the one-way clutch.

10 Claims, 7 Drawing Sheets

DISCONNECTING DIFFERENTIAL AND ELECTRIC DRIVE TRANSMISSION SYSTEM HAVING THE SAME

CROSS-REFERENCE TO RELATED APPLICATIONS

This application claims the benefit of China Patent Application No. 202210307615.3 filed Mar. 25, 2022, the entire contents of which are incorporated herein by reference in its entirety.

TECHNICAL FIELD

The disclosure relates to the field of electric drive transmission systems for vehicles, and in particular provides a disconnecting differential and an electric drive transmission system having the disconnecting differential.

BACKGROUND

In order to reduce the friction loss and avoid a resistance torque generated by a counter electromotive force of a permanent magnet motor, thus saving energy and increasing the range, it is often necessary to add a power interruption mechanism to a single-speed electric power assembly product mounted in a vehicle, making it possible to cut off the coupling between the electric power assembly and wheels when the vehicle is coasting or when no power output is required from the electric power assembly. It is preferable for such a power interruption mechanism to be arranged at a position close to a wheel transmission shaft, so as to reduce the load and friction loss of the vehicle to the greatest extent. A common power interruption mechanism is generally arranged in a differential assembly, and is referred as a disconnecting differential. Although such disconnecting differentials can realize the speed differential and forward and reverse power transmission functions of normal differentials, and can realize the interruption of power transmission in a state of reverse transmission of power such as coasting, a tooth-interlocking type (dog type) is often adopted in order to reduce friction, in which power transmission and interruption are realized by meshing and disconnecting of engagement teeth on a driving side and on a driven side. Although they can realize the functions, they bring the problem of NVH (abbreviation of Noise, Vibration, Harshness): when the engagement teeth are engaged, they are very prone to impact to generate abnormal noise, and the engagement teeth are very prone to wear.

Accordingly, there is a need in the art for a new disconnecting differential and an electric drive transmission system having the disconnecting differential, in order to solve the problem of the existing disconnecting differential being unable to selectively interrupt power transmission in the reverse power transmission state such as coasting and also to avoid NVH during engagement while ensuring the speed differential and forward and reverse power transmission functions of a normal differential.

BRIEF SUMMARY

The disclosure aims to solve the above technical problem, that is, to solve the problem of the existing disconnecting differential being unable to selectively interrupt power transmission in the reverse power transmission state such as coasting and also to avoid NVH during engagement while ensuring the speed differential and forward and reverse power transmission functions of a normal differential.

In a first aspect, the disclosure provides a disconnecting differential, which comprises a differential housing and a planet carrier arranged in the differential housing, the disconnecting differential further comprising: a first one-way clutch and a second one-way clutch, wherein the first one-way clutch and the second one-way clutch are arranged in parallel between the planet carrier and the differential housing, outer rings of the first one-way clutch and the second one-way clutch are connected to or formed integrally with an inner wall of the differential housing, and inner rings of the first one-way clutch and the second one-way clutch are connected to or formed integrally with an outer wall of the planet carrier; and the first one-way clutch is configured to be locked in a forward rotation driving condition and a reverse rotation coasting condition, and to slip in a reverse rotation driving condition and a forward rotation coasting condition, and the second one-way clutch is configured to be locked in the reverse rotation driving condition and the forward rotation coasting condition, and to slip in the forward rotation driving condition and the reverse rotation coasting condition; and an interruption device, comprising a power section and an interruption section, wherein the interruption section is configured to rotate synchronously relative to the differential housing and to shift all rolling elements in the second one-way clutch under the action of the power section, such that the second one-way clutch slips in the forward rotation coasting condition so as to release a locking function of the second one-way clutch, and the interruption section is further configured to release the shifting of all of the rolling elements, so as to restore the locking function of the second one-way clutch.

In a preferred technical solution of the disconnecting differential as described above, the interruption section comprises a push-pull body, a plurality of push-pull pins and an elastic member, wherein the push-pull body is ring-shaped, the push-pull body is arranged on an outer periphery of a shaft hole of the differential housing in an axially movable manner, the differential housing is provided with a plurality of holes configured to be in one-to-one correspondence with all of the rolling elements, each of the push-pull pins is arranged on the side of the push-pull body facing the second one-way clutch and is inserted into a respective hole in one-to-one correspondence, and the elastic member is arranged between the differential housing and the push-pull body; the power section is configured to push the push-pull body to move in a direction of the second one-way clutch, such that each of the push-pull pins shifts a respective rolling element in one-to-one correspondence, the second one-way clutch slips in the forward rotation coasting condition so as to release the locking function of the second one-way clutch, and the elastic member is compressed; and when the deformation of the elastic member is restored, the push-pull body moves in a direction away from the second one-way clutch under the action of the elastic member, such that each of the push-pull pins is disengaged from a respective rolling element in one-to-one correspondence to release the shifting of all of the rolling elements, so as to restore the locking function of the second one-way clutch.

In a preferred technical solution of the disconnecting differential as described above, the power section comprises an electromagnetic coil, and the push-pull body is made of an armature material and is arranged between the electromagnetic coil and the differential housing; wherein when the electromagnetic coil is energized, a repulsive force is generated between the electromagnetic coil and the push-pull body, such that the push-pull body moves in the direction of the second one-way clutch, and the elastic member is compressed.

In a preferred technical solution of the disconnecting differential as described above, a ring-shaped flange is formed on the outer periphery of the shaft hole of the differential housing, and the push-pull body is sleeved on an outer side wall of the ring-shaped flange in an axially movable manner.

In a preferred technical solution of the disconnecting differential as described above, the elastic member is a disc-shaped return spring or a helical compression spring.

In a preferred technical solution of the disconnecting differential as described above, the electromagnetic coil is fixed to an inner wall of a reduction gearbox.

In a preferred technical solution of the disconnecting differential as described above, the first one-way clutch is a cylinder-type one-way clutch or a wedge-type one-way clutch; and/or the second one-way clutch is a cylinder-type one-way clutch or a wedge-type one-way clutch.

In a preferred technical solution of the disconnecting differential as described above, the differential housing comprises a left differential housing and a right differential housing, and the left differential housing and the right differential housing are welded to each other.

In a preferred technical solution of the disconnecting differential as described above, a main reduction gear of the disconnecting differential is welded or bolted to or is formed integrally with the left differential housing or the right differential housing.

In another aspect, the disclosure further provides an electric drive transmission system, comprising the disconnecting differential according to any one of the above implementations.

Those skilled in the art can understand that the disconnecting differential of the disclosure comprises a differential housing and a planet carrier arranged in the differential housing, wherein the disconnecting differential further comprises: a first one-way clutch, a second one-way clutch, and an interruption device, wherein the first one-way clutch and the second one-way clutch are arranged in parallel between the planet carrier and the differential housing, outer rings of the first one-way clutch and the second one-way clutch are connected to or formed integrally with an inner wall of the differential housing, and inner rings of the first one-way clutch and the second one-way clutch are connected to or formed integrally with an outer wall of the planet carrier; the first one-way clutch is configured to be locked in a forward rotation driving condition and a reverse rotation coasting condition, and to slip in a reverse rotation driving condition and a forward rotation coasting condition, and the second one-way clutch is configured to be locked in the reverse rotation driving condition and the forward rotation coasting condition, and to slip in the forward rotation driving condition and the reverse rotation coasting condition; and the interruption device comprises a power section and an interruption section, wherein the interruption section is configured to rotate synchronously relative to the differential housing and to shift all rolling elements in the second one-way clutch under the action of the power section, such that the second one-way clutch slips in the forward rotation coasting condition so as to release a locking function of the second one-way clutch, and the interruption section is further configured to release the shifting of all of the rolling elements, so as to restore the locking function of the second one-way clutch.

According to the above configuration, in the forward rotation driving condition of the electric drive transmission system, the first one-way clutch is locked, and the second one-way clutch slips, such that power flow is sequentially transmitted through the main reduction gear, the differential housing, the first one-way clutch, the planet carrier, a planetary gear shaft and a planetary gear to a left axle shaft gear and a right axle shaft gear respectively, and is in turn transmitted through a left axle shaft and a right axle shaft to wheels on two sides, so as to realize normal forward driving of the vehicle. In the reverse rotation driving condition of the electric drive transmission system, the first one-way clutch slips, and the second one-way clutch is locked, such that the power flow is sequentially transmitted through the main reduction gear, the differential housing, the second one-way clutch, the planet carrier, the planetary gear shaft and the planetary gear to the left axle shaft gear and the right axle shaft gear respectively, and is in turn transmitted through the left axle shaft and the right axle shaft to the wheels on the two sides, so as to realize reverse driving of the vehicle. When the electric drive transmission system is in forward rotation coasting, the first one-way clutch slips, and the second one-way clutch is locked. According to the disclosure, the power section of the interruption device of the disclosure is controlled to operate such that the interruption section shifts all of the rolling elements in the second one-way clutch under the action of the power section, and the second one-way clutch slips. At this time, the power flow is transmitted through the left axle shaft and the right axle shaft of the vehicle to the left axle shaft gear and the right axle shaft gear, and is in turn transmitted through the planetary gear and the planetary gear shaft to the planet carrier. In this case, the first one-way clutch and the second one-way clutch both slip, so that power transmission can be interrupted to avoid the resistance torque generated by counter electromotive force of the permanent magnet motor at the front and to improve the brake energy recovery rate of a motor at the rear of the vehicle, thus saving energy and increasing the range. When the vehicle requires no power interruption operation, the interruption section may release the shifting of all of the rolling elements, such that the rolling elements are restored to their original positions, that is, restored to the locked state of the second one-way clutch in the forward rotation coasting condition. Since the way to realize power interruption described above is to shift all of the rolling elements in the second one-way clutch, in which case the way of engagement is shifting, the actuation force is small and there is no noise.

BRIEF DESCRIPTION OF THE SEVERAL VIEWS OF THE DRAWINGS

Preferred implementations of the disclosure are described below with reference to the drawings in which.

LIST OF REFERENCE SIGNS

1—Main reduction gear; 2—Differential housing; 21—Left differential housing; 22—Right differential housing; 221—Ring-shaped flange; 3—Planet carrier; 4—First one-way clutch; 5—Second one-way clutch; 51—Rolling element; 6—Interruption device; 61—Power section; 611—Electromagnetic coil; 62—Interruption section; 621—Push-pull body; 622—Push-pull pin; 623—Elastic member; 70—Planetary gear shaft; 71—Planetary gear; 72—Left axle shaft gear; 73—Right axle shaft gear; 74—Left axle shaft; 75—Right axle shaft.

DETAILED DESCRIPTION

Preferred implementations of the disclosure are described below with reference to the accompanying drawings. Those skilled in the art should understand that these implementations are only used to explain the technical principles of the disclosure, and are not intended to limit the scope of protection of the disclosure. Those skilled in the art can make adjustments according to requirements, so as to adapt to specific application scenarios.

It should be noted that, in the description of the disclosure, the terms that indicate the direction or positional relationship, such as "left" and "right" are based on the direction or positional relationship shown in the figures, which is merely for ease of description instead of indicating or implying that the device must have a particular orientation and be constructed and operated in a particular orientation, and therefore, should not be construed as limiting the disclosure. In addition, the terms "first" and "second" are used for descriptive purposes only, and cannot be construed as indicating or implying relative importance.

In addition, it should also be noted that, in the description of the disclosure, the terms "mount", "engage" and "connect" should be interpreted in a broad sense unless explicitly defined and limited otherwise, which, for example, may mean a fixed connection, a detachable connection or an integral connection; or may be a direct connection, or an indirect connection by means of an intermediate medium. For those skilled in the art, the specific meanings of the foregoing terms in the disclosure can be interpreted according to a specific situation.

As shown in FIGS. 1 to 7, the disclosure aims to solve the above technical problem, that is, to solve the problem of the existing disconnecting differential being unable to selectively interrupt power transmission in the reverse power transmission state such as coasting and also to avoid NVH during engagement while ensuring the speed differential and forward and reverse power transmission functions of a normal differential. The disclosure provides a disconnecting differential, comprising a main reduction gear 1, a differential housing 2 and a planet carrier 3. The main reduction gear 1 is fixedly connected to the differential housing 2 to drive the differential housing 2 to rotate, and the planet carrier 3 is arranged in the differential housing 2. The disconnecting differential further comprises: a first one-way clutch 4, a second one-way clutch 5 and an interruption device 6. The first one-way clutch 4 and the second one-way clutch 5 are arranged in parallel between the planet carrier 3 and the differential housing 2, outer rings of the first one-way clutch 4 and the second one-way clutch 5 are connected (e.g., welded or bolted) to or formed integrally with an inner wall of the differential housing 2, and inner rings of the first one-way clutch 4 and the second one-way clutch 5 are connected (e.g., welded or bolted) to or formed integrally with an outer wall of the planet carrier. The first one-way clutch 4 is configured to be locked in a forward rotation driving condition and a reverse rotation coasting condition, and to slip in a reverse rotation driving condition and a forward rotation coasting condition, and the second one-way clutch 5 is configured to be locked in the reverse rotation driving condition and the forward rotation coasting condition, and to slip in the forward rotation driving condition and the reverse rotation coasting condition. The interruption device 6 comprises a power section 61 and an interruption section 62. The interruption section 62 is configured to rotate synchronously relative to the differential housing 2, for example, to be arranged on the differential housing 2, and can shift all rolling elements 51 in the second one-way clutch 5 under the action of the power section 61, such that the second one-way clutch 5 slips in the forward rotation coasting condition so as to release a locking function of the second one-way clutch 5. The interruption section 62 further can release the shifting of all of the rolling elements 51, i.e., restoring the locking function of the second one-way clutch 5. The first one-way clutch 4 may be a cylinder-type one-way clutch, or may be a wedge-type one-way clutch. Similarly, the second one-way clutch 5 may be a cylinder-type one-way clutch, in which case the rolling elements 51 are rollers, or the second one-way clutch may be a wedge-type one-way clutch, in which case the rolling elements 51 are wedges.

It can be understood that, by the interruption section 62 shifting all of the rolling elements 51 in the second one-way clutch 5, it is meant that torque cannot be transmitted from the outer ring of the one-way clutch to the inner ring of the one-way clutch through the rolling elements 51. For example, referring to FIG. 6, the outer ring of the second one-way clutch 62 is arranged on the outer periphery of the inner ring of the second one-way clutch and is rotatable relative to the inner ring, an inner wall of the outer ring is provided with a plurality of grooves in a circumferential direction, a bottom surface of each groove is inclined to form a cam surface, a wedge-shaped space is formed between the cam surface and an outer peripheral surface of the inner ring, and a rolling element 51 and a force applying spring that applies force to the rolling element 51 in a direction of a narrow portion (small end) of the wedge-shaped space are received in the groove. In this configuration, the interruption section 62 is configured to rotate synchronously relative to the differential housing 2, that is, the interruption section 62 and the differential housing 2 are relatively stationary, and at this time, the rolling element 51 may be shifted by the interruption section 62 in a direction of a wide portion of the groove (large end), that is, shifted from a to b, so as to realize slipping and interruption of torque transmission. In addition, the interruption section 62 can shift all of the rolling elements 51 in the second one-way clutch 5, which may be direct shifting, such as shifting the rolling elements 51 one by one; or may be indirect shifting, in which case, for example, the second one-way clutch 5 further comprises a connecting ring connected to all of the rolling elements 51, and the connecting ring is shifted such that all of the rolling elements 51 are moved in the direction of the wide portion of the groove. Alternatively, when the second one-way clutch 5 is a wedge-type one-way clutch, the torque is transmitted through a wedge (cam ramp). A long diameter of the wedge is larger than the distance between the inner ring and the outer ring, and a short diameter is smaller than the distance between the inner ring and the outer ring. In this case, the long diameter of the wedge may be shifted to prevent the wedge from forming a whole with the inner ring and the outer ring of the second one-way clutch 5 to transmit torque.

It can be understood that, the planet carrier 3 of the disclosure may be a hollow cylindrical structure, and the interior of the planet carrier 3 is configured to receive a planetary gear 71, a left axle shaft gear 72 and a right axle shaft gear 73. A planetary gear shaft 70 of the planetary gear 71 is mounted on the planet carrier 3.

Figure 1:
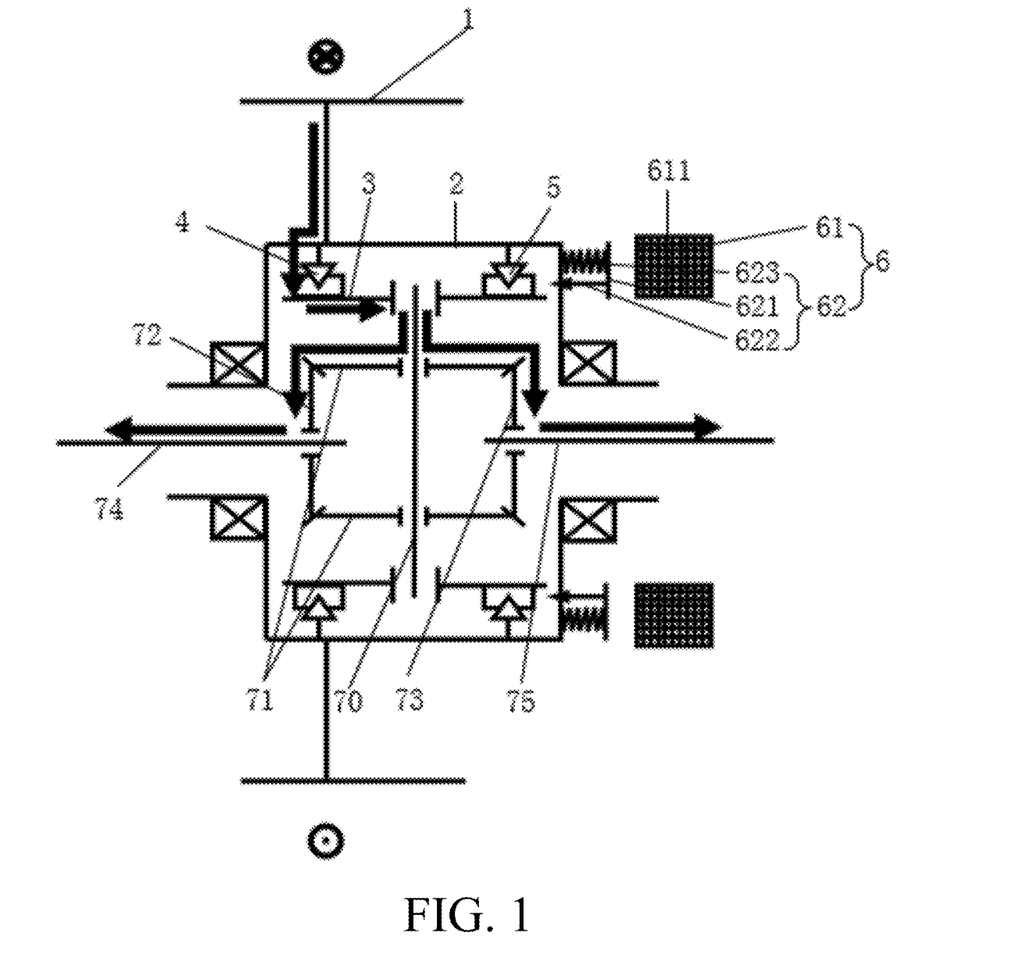
FIG. 1 is a schematic diagram of a disconnecting differential and an electric drive transmission system having the disconnecting differential of the disclosure during forward rotation driving.

According to the above configuration, it is made possible that in the forward rotation driving condition of the electric drive transmission system, referring to FIG. 1, that is, when the electric power assembly of the vehicle outputs power and the main reduction gear 1 rotates forward, the first one-way clutch 4 is locked, and the second one-way clutch 5 slips, that is, the first one-way clutch 4 can provide torque, and the second one-way clutch 5 cannot provide torque, such that power flow is sequentially transmitted through the main reduction gear 1, the differential housing 2, the first one-way clutch 4, the planet carrier 3, the planetary gear shaft 70 and the planetary gear 71 to the left axle shaft gear 72 and the right axle shaft gear 73 respectively, and is in turn transmitted through a left axle shaft 74 and a right axle shaft 75 to wheels on two sides, so as to realize normal forward driving of the vehicle.

Figure 2:
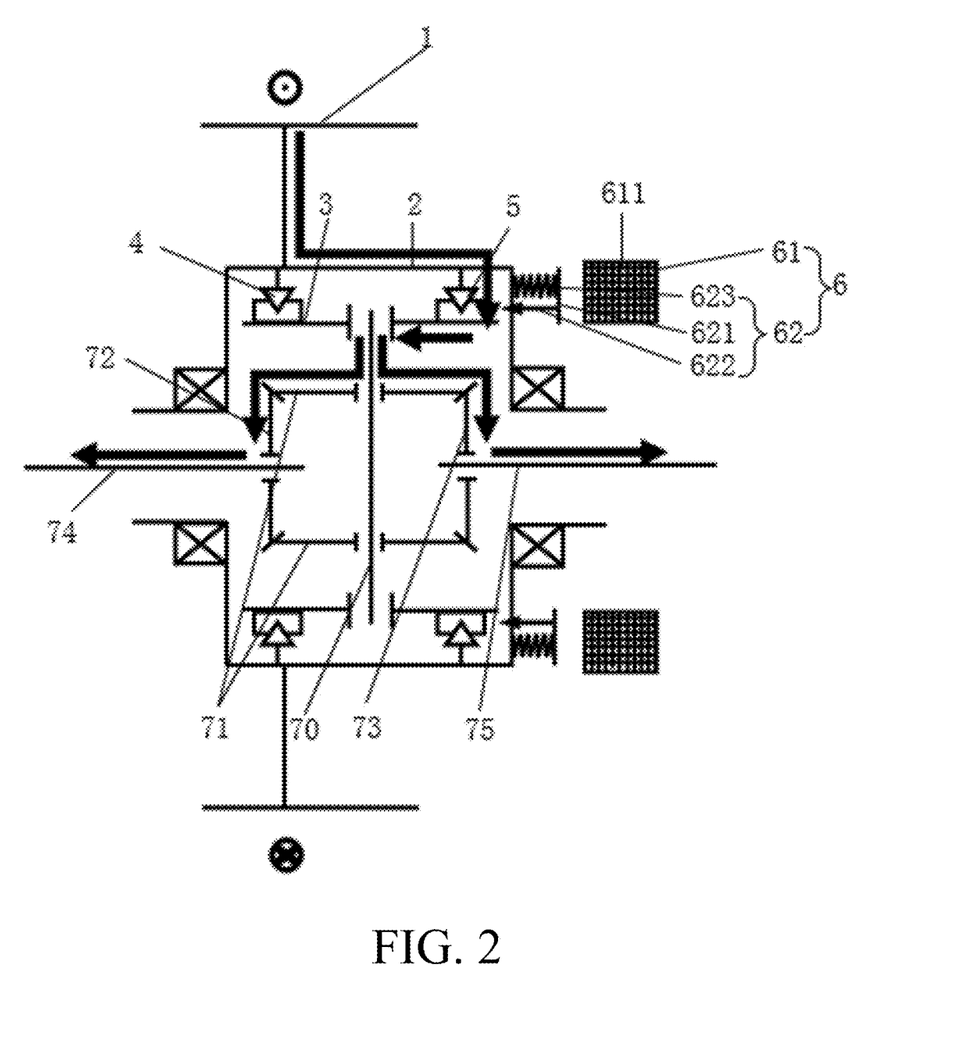
FIG. 2 is a schematic diagram of the disconnecting differential and the electric drive transmission system having the disconnecting differential of the disclosure during reverse rotation driving.

In the reverse rotation driving condition of the electric drive transmission system, referring to FIG. 2, that is, when the electric power assembly of the vehicle outputs power and the main reduction gear 1 rotates reverse, the first one-way clutch 4 slips, and the second one-way clutch 5 is locked, that is, the first one-way clutch 4 cannot provide torque, and the second one-way clutch 5 can provide torque, such that the power flow is sequentially transmitted through the main reduction gear 1, the differential housing 2, the second one-way clutch 5, the planet carrier 3, the planetary gear shaft 70 and the planetary gear 71 to the left axle shaft gear 72 and the right axle shaft gear 73 respectively, and is in turn transmitted through the left axle shaft 74 and the right axle shaft 75 to the wheels on the two sides, so as to realize reverse driving of the vehicle.

Figure 3:
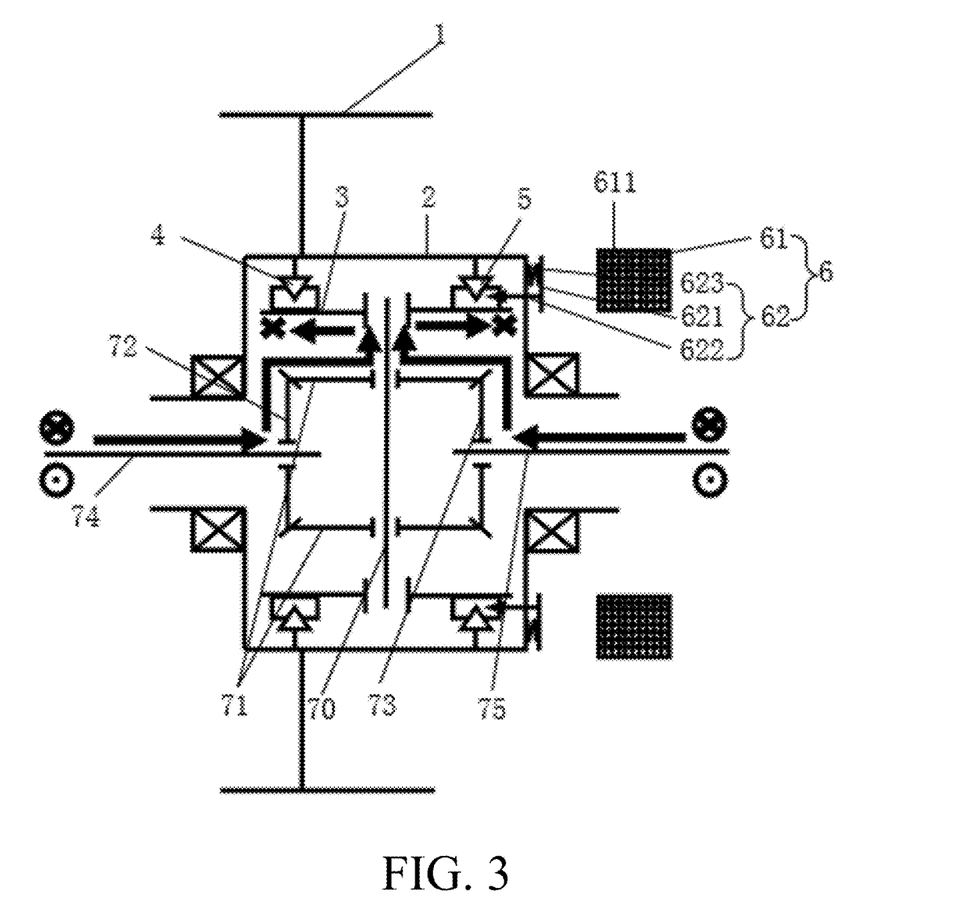
FIG. 3 is a schematic diagram of the disconnecting differential and the electric drive transmission system having the disconnecting differential of the disclosure during forward rotation coasting.

When the electric drive transmission system is in the forward rotating coasting, referring to FIG. 3, that is, when the electric power assembly of the vehicle does not output power and the wheels rotate forward, for example, when the vehicle is in forward coasting, the wheels drive the left axle shaft gear 72 and the right axle shaft gear 73 to rotate forward by means of the left axle shaft 74 and the right axle shaft 75, and in turn the planet carrier 3 is driven to rotate forward by means of the planetary gear 71 and the planetary gear shaft 70, in which case the first one-way clutch 4 slips and the second one-way clutch 5 is locked. In this case, in order to ensure that the connection between the electric power assembly and the wheels is cut off, the power section 61 of the interruption device 6 of the disclosure may be controlled to operate such that the interruption section 62 shifts all of the rolling elements 51 in the second one-way clutch 5 under the action of the power section 61, and the second one-way clutch 5 slips, that is, the locking function of the second one-way clutch 5 is released. At this time, the power flow is transmitted through the left axle shaft 74 and the right axle shaft 75 of the vehicle to the left axle shaft gear 72 and the right axle shaft gear 73, and is in turn transmitted through the planetary gear 71 and the planetary gear shaft 70 to the planet carrier 3. In this case, the first one-way clutch 4 and the second one-way clutch 5 both slip, so that power transmission can be interrupted to avoid the resistance torque generated by counter electromotive force of the permanent magnet motor at the front of the vehicle and to improve the brake energy recovery rate of a motor at the rear of the vehicle, thus saving energy and increasing the range. When the vehicle requires no power interruption operation, the interruption section 62 may release the shifting of all of the rolling elements 51, such that the rolling elements 51 are restored to their original positions, that is, restored to the locked state of the second one-way clutch 5 in the forward rotation coasting condition. Since the way to realize power interruption described above is to shift all of the rolling elements 51 in the second one-way clutch 5, in which case the way of engagement is shifting, the actuation force is small and there is no noise.

When the electric drive transmission system is in the reverse rotating coasting, that is, when the electric power assembly of the vehicle does not output power and the wheels rotate reversely, for example, when the vehicle is in reverse coasting, the wheels drive the left axle shaft gear 72 and the right axle shaft gear 73 to rotate reversely by means of the left axle shaft 74 and the right axle shaft 75, and in turn the planet carrier 3 is driven to rotate reversely by means of the planetary gear 71 and the planetary gear shaft 70, in which case the first one-way clutch 4 is locked and the second one-way clutch 5 slips.

The specific structure of the disconnecting differential of the disclosure will be introduced below.

Figure 4:
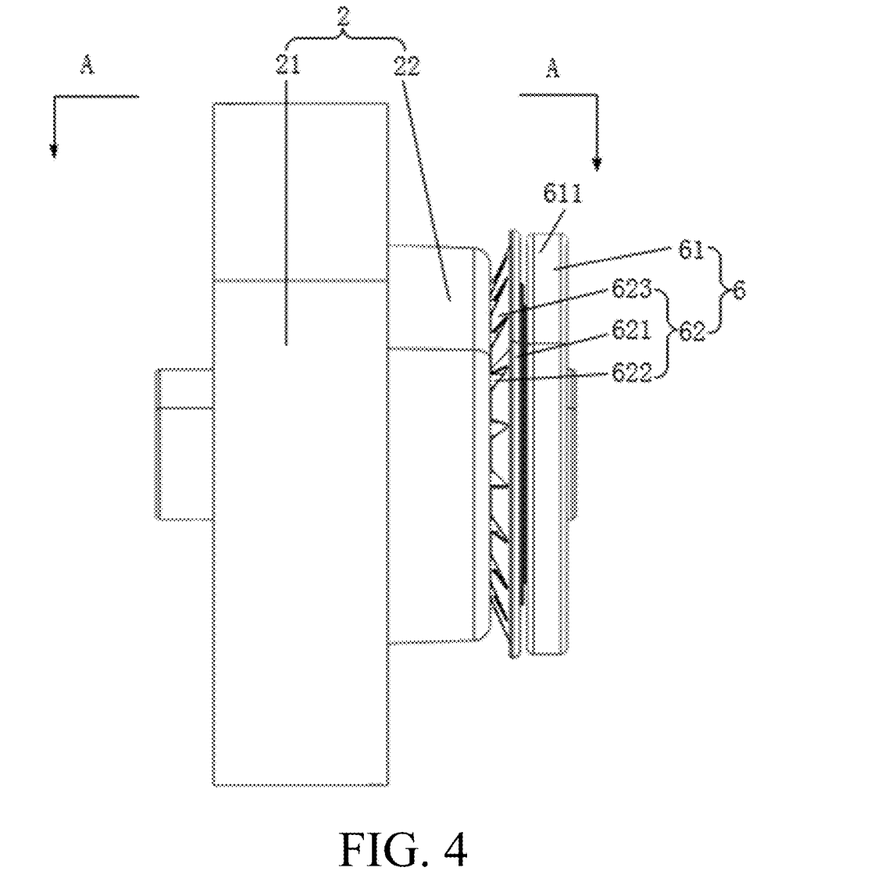
FIG. 4 is a structural schematic diagram of the disconnecting differential of the disclosure.
Figure 5:
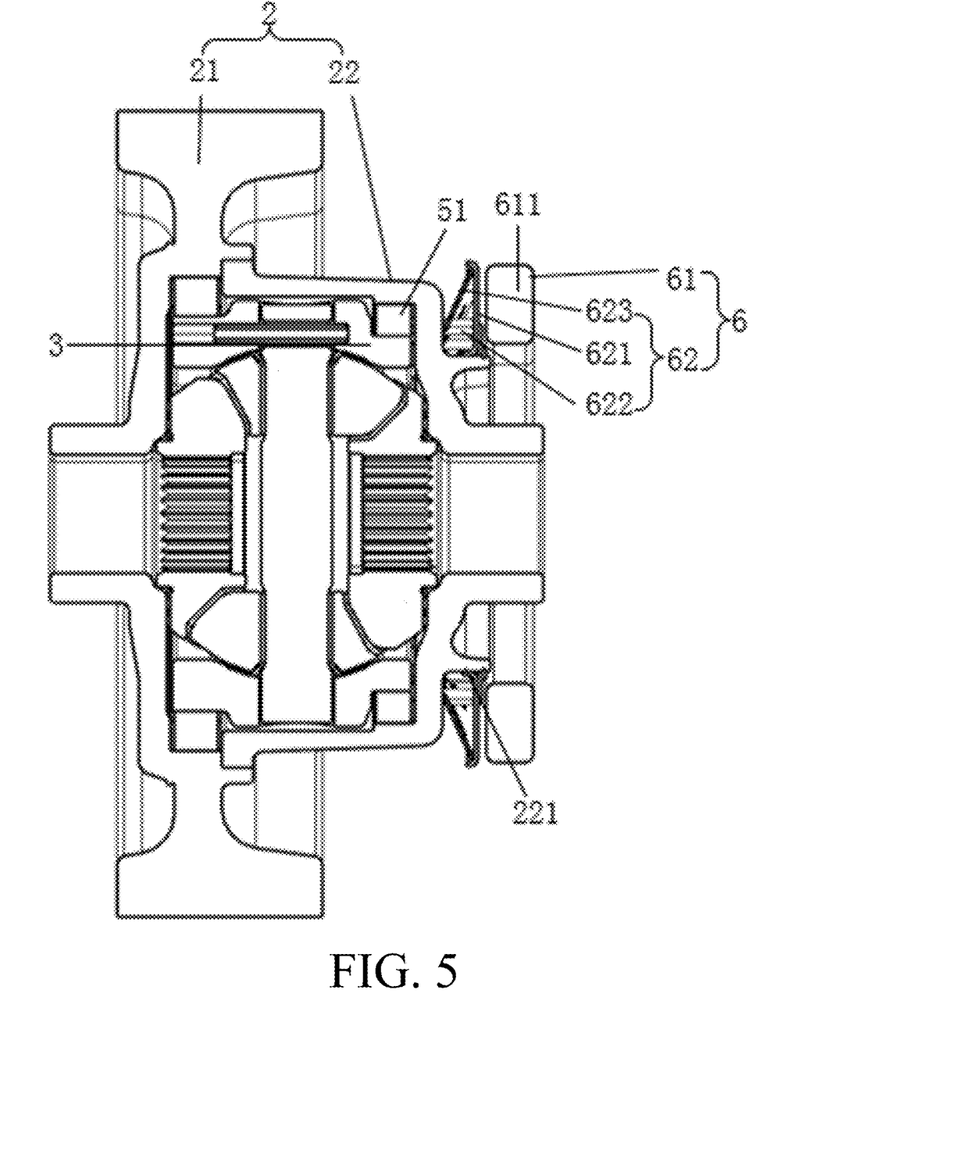
FIG. 5 is a sectional view at A-A in FIG. 4.
Figure 6:
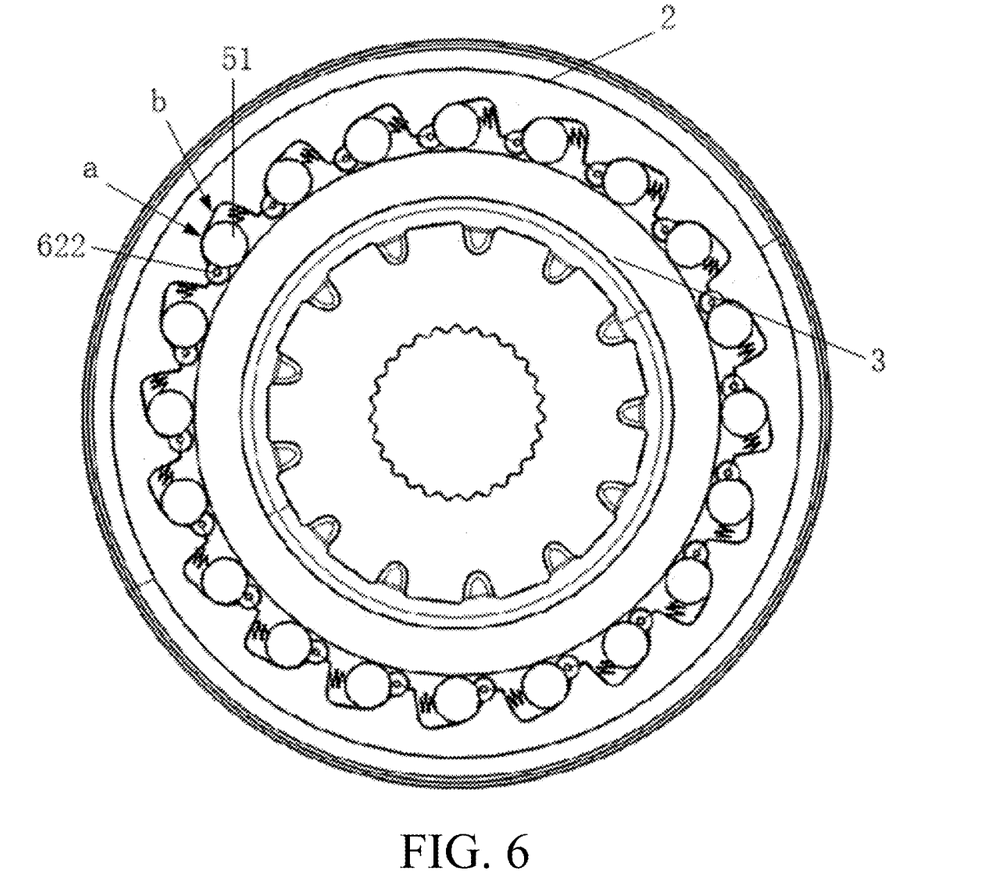
FIG. 6 is a structural schematic diagram of the positional relationship between a second one-way clutch and rolling elements of the disconnecting differential of the disclosure.
Figure 7:
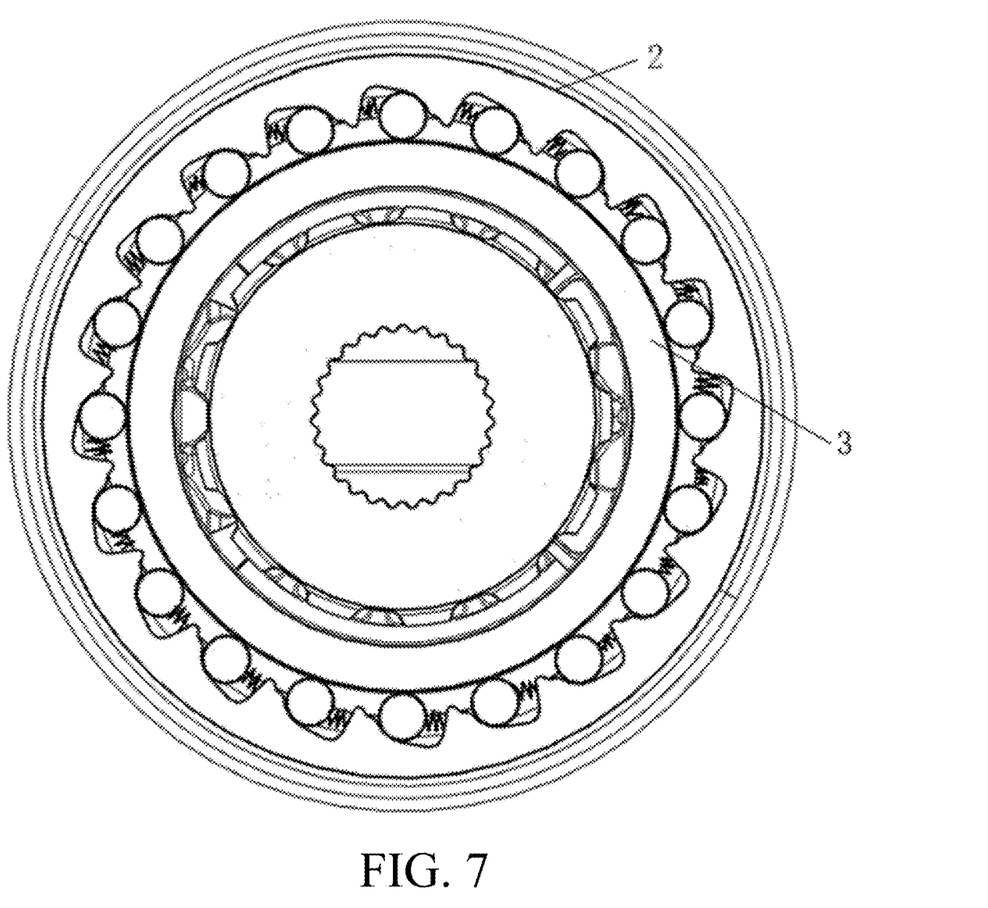
FIG. 7 is a structural schematic diagram of a first one-way clutch of the disconnecting differential of the disclosure.

As a possible implementation, the interruption section 62 comprises a push-pull body 621, a plurality of push-pull pins 622 and an elastic member 623. The push-pull body 621 is ring-shaped, and the push-pull body 621 is preferably plate-shaped. Of course, other shapes are also possible. A ring-shaped flange 221 is formed on an outer periphery of a shaft hole of the differential housing 2, and the push-pull body 621 is sleeved on an outer side wall of the ring-shaped flange 221 in an axially movable manner, for example, in clearance fit. Of course, the configuration may be adjusted, for example, a plurality of brackets are provided on an end surface of the outer periphery of the shaft hole of the differential housing 2, the plurality of brackets are supported on an inner ring wall of the push-pull body 621 and form a movable gap with the push-pull body 621. In addition, the differential housing 2 is provided with a plurality of holes which can be in one-to-one correspondence with all of the rolling elements 51, and each of the push-pull pins 622 is arranged on the side of the push-pull body 621 facing the second one-way clutch 5 and is inserted into a respective hole in one-to-one correspondence. The elastic member 623 is arranged between the differential housing 2 and push-pull body 621. The elastic member 623 may be a disc-shaped return spring, or a helical compression spring, etc., and may be specifically configured in a variety of ways. For example, one end of the disc-shaped return spring abuts against the differential housing 2, and the other end thereof is formed integrally with the push-pull body 621. In this case, disc-shaped return springs may be evenly spaced in the circumferential direction of push-pull body 621. Alternatively, one end of the helical compression spring abuts against the differential housing 2, and the other end thereof is hooked to the push-pull body 621. The power section 61 can push the push-pull body 621 to move in a direction of the second one-way clutch 5, such that each of the push-pull pins 622 shifts a respective rolling element 51 in one-to-one correspondence, the second one-way clutch 5 slips in the forward rotation coasting condition so as to release the locking function of the second one-way clutch 5, and the elastic member 623 is compressed. When the deformation of the elastic member 623 is restored, the push-pull body 621 moves in a direction away from the second one-way clutch 5 under the action of the elastic member 623, such that each of the push-pull pins 622 is disengaged from a respective rolling element 51 in one-to-one correspondence to release the shifting of all of the rolling elements, so as to restore the locking function of the second one-way clutch 5.

It is possible that the power section 61 comprises an electromagnetic coil 611, and the push-pull body 621 is made of an armature material and is arranged between the electromagnetic coil 611 and the differential housing 2. When the electromagnetic coil 611 is energized, a repulsive force is generated between the electromagnetic coil 611 and the push-pull body 621, such that the push-pull body 621 moves in the direction of the second one-way clutch 5, and the elastic member 623 is compressed. It is possible that the electromagnetic coil 611 may be fixed to an inner wall of a reduction gearbox. It can be understood that the differential housing 2 is arranged inside the reduction gearbox.

The operation process of the above configuration consists in that when the electromagnetic coil 611 is energized, a repulsive force is generated between the electromagnetic coil 611 and the push-pull body 621, such that the push-pull body 621 moves in the direction of the second one-way clutch 5, and the elastic member 623 is compressed. The push-pull pin 622 on the push-pull body 621 moves synchronously, that is, the push-pull pin 622 moves in the hole in the differential housing 2 in the direction of the one-way clutch, and during the movement, a head of the push-pull pin 622 will first come into contact with the rolling element 51. Since the head of the push-pull pin 622 is conical, the rolling element 51 can be shifted during the movement of the push-pull pin 622, such that the second clutch slips. When the electromagnetic coil 611 is de-energized, the repulsive force between the electromagnetic coil 611 and the push-pull body 621 disappears, and the deformation of the elastic member 623 is restored, such that the push-pull body 621 moves in the direction away from the second one-way clutch 5 under the action of the elastic member 623, the push-pull body 621 returns and drives each of the push-pull pins 622 on the push-pull body 621 to return, and in turn each of the push-pull pins 622 is disengaged from the respective rolling element 51 in one-to-one correspondence, such that the second one-way clutch 5 maintains the original operation state.

Since the above configuration is used in a condition in which the second one-way clutch 5 is locked, and by adopting the above way of shifting the rolling elements 51 by the push-pull pins 622, the response is very fast and there is no noise during engagement. In addition, since the electromagnetic coil 611 only needs to be energized when performing electric power interruption on the vehicle, and it is not necessary to energize the electromagnetic coil 611 in a normal driving state of the vehicle in which the electric power assembly outputs power, the disclosure can reduce power consumption. In addition, by means of the configuration in which the push-pull pins 622 pushes the rolling elements 51, the wear phenomenon can be greatly reduced, the overall structure is not complicated, and the cost is low.

In addition, preferably, two ends of each of the first one-way clutch 4 and the second one-way clutch 5 are open, that is, the two ends of the second one-way clutch 5 in an axial direction of the differential housing 2 are open and there are no end caps. Rather, an end face of the differential housing 2 shields the internal structure of the second one-way clutch 5, so that it is only necessary to provide holes in the end face of the differential housing 2 for easy access of the push-pull pins 622. Similarly, the two ends of the first one-way clutch 4 in the axial direction of the differential housing 2 are open and there are no end caps, and the end face of the differential housing 2 shields the internal structure of the first one-way clutch 4. Of course, the configuration may also be adjusted, for example, end caps may be provided at the two ends.

As a possible implementation, the differential housing 2 comprises a left differential housing 21 and a right differential housing 22. The left differential housing 21 and the right differential housing 22 are welded to each other to improve the strength of connection between the left differential housing 21 and the right differential housing 22. It can be understood that, the left differential housing 21 and the right differential housing 22 are welded together to form the differential housing 2. Based on the front and rear direction of the vehicle, when viewed from the rear of the vehicle toward the front of the vehicle, the left differential housing 21 is close to the left side, and the right differential housing 22 is close to the right side.

As a possible implementation, the main reduction gear 1 is welded to the left differential housing 21 or the right differential housing 22 to complete the fixed connection, of course, it may be replaced by a bolted connection or integral formation.

In summary, according to the disclosure, a pair of parallel one-way clutches with opposite locking directions are provided between the differential housing 2 and the planet carrier 3, and at the same time an interruption device 6 is provided to block the locking function of one of the one-way clutches in the forward rotation coasting condition as required, so as to realize the function of one-way power interruption as required. The power transmission in the reverse power transmission state such as coasting can be selectively interrupted while achieving the speed differential and forward and reverse power transmission functions of the normal differential. The structure is novel and the operation accuracy is high, and the NVH problem during engagement can also be avoided. No electromagnetic force action is needed when there is no demand for power interruption, so that energy is saved, and the mechanism is simple in structure, fast in response, stable and reliable, noiseless, low in wear and low in cost.

It should be noted that the foregoing implementations are only used to explain the principles of the disclosure, and are not intended to limit the scope of protection of the disclosure. Those skilled in the art can adjust the foregoing implementations without departing from the principle of the disclosure, so that the disclosure is applicable to more specific application scenarios.

For example, as an alternative implementation, the configuration of the power section 61 is not unique, and may be adjusted as long as the push-pull body 621 can be pushed. For example, the power section 61 is an electric push rod, and a push rod portion of the electric push rod is connected to the push-pull body 621, such that when the vehicle requires power interruption, a motor of the electric push rod rotates forward, such that the push rod portion pushes the push-pull body 621 to move in the direction of the second one-way clutch 5. When disconnected, the motor of the electric push rod rotates reversely, such that the push rod portion of the electric push rod is retracted to push the push-pull body 621 to move in the direction away from the first one-way clutch 4. These all do not deviate from the principle of the disclosure, and are all within the scope of protection of the disclosure.

For example, as an alternative implementation, the specific structural configuration of the interruption section 62 is not unique, and the configuration may be adjusted as long as all of the rolling elements 51 can be shifted, and the limitation to all of the rolling elements 51 are released. For example, the connecting ring is provided with a sheet, an arc-shaped hole is formed in the end face of the differential housing 2, the interruption section 62 is a strip-shaped structure, and the strip-shaped structure passes through the arc-shaped hole from the outer side of the differential housing 2 and is attached to the sheet. The power section 61 comprises a motor and a connecting rod, one end of the connecting rod is connect to a side wall of an output shaft of the motor and the other end thereof is connected to the strip-shaped structure, and the motor is fixed to the end face of the differential housing 2, such that when the output shaft of the motor rotates forward, the connecting rod drives the strip-shaped structure to rotate forward in the arc-shaped hole, then the strip-shaped structure pushes the sheet to move, so that all of the rolling elements 51 are shifted by the connecting ring; and when the output shaft of the motor rotates reversely, the rolling elements 51 are restored to the original positions under the action of the force applying springs. These all do not deviate from the principle of the disclosure, and are all within the scope of protection of the disclosure.

Although the disclosure is introduced given that the electromagnetic coil 611 is fixed to the inner wall of the reduction gearbox, this is not intended to limit the scope of protection of the disclosure. For example, as an alternative implementation, the electromagnetic coil 611 may also be fixed to the ring-shaped flange 221. These all do not deviate from the principle of the disclosure, and are all within the scope of protection of the disclosure.

In addition, the disclosure further provides an electric drive transmission system, such as an electric drive transmission system for a battery electric vehicle. The electric drive transmission system comprises the disconnecting differential described in any of the above implementations.

With the disconnecting differential, the torque is transmitted when the electric drive transmission system is in the forward rotation driving and the reverse rotation driving, no electromagnetic force is required to realize fixed connection between the disconnecting differential and the wheels when there is no demand for power interruption, and in the forward rotation coasting, the locking function of the one-way clutch in the forward rotation coasting condition can be released as required, so that the electric drive transmission system has reduced power consumption, no noise, less wear, less energy consumption, uncomplicated overall structure and low costs.

Heretofore, the technical solutions of the disclosure have been described with reference to the preferred implementations shown in the accompanying drawings. However, those skilled in the art can readily understand that the scope of protection of the disclosure is apparently not limited to these specific implementations. Those skilled in the art may make equivalent changes or substitutions to the related technical features without departing from the principle of the disclosure, and all the technical solutions with such changes or substitutions shall fall within the scope of protection of the disclosure.

What is claimed is:

1. A disconnecting differential, which comprises a differential housing and a planet carrier arranged in the differential housing, the disconnecting differential further comprising:
   a first one-way clutch and a second one-way clutch, wherein the first one-way clutch and the second one-way clutch are arranged in parallel between the planet carrier and the differential housing, outer rings of the first one-way clutch and the second one-way clutch are connected to or formed integrally with an inner wall of the differential housing, and inner rings of the first one-way clutch and the second one-way clutch are connected to or formed integrally with an outer wall of the planet carrier; and the first one-way clutch is configured to be locked in a forward rotation driving condition and a reverse rotation coasting condition, and to slip in a reverse rotation driving condition and a forward rotation coasting condition, and the second one-way clutch is configured to be locked in the reverse rotation driving condition and the forward rotation coasting condition, and to slip in the forward rotation driving condition and the reverse rotation coasting condition; and
   an interruption device, comprising a power section and an interruption section, wherein the interruption section is configured to rotate synchronously relative to the differential housing and to shift all rolling elements in the second one-way clutch under the action of the power section, such that the second one-way clutch slips in the forward rotation coasting condition so as to release a locking function of the second one-way clutch, and the interruption section is further configured to release the shifting of all of the rolling elements, so as to restore the locking function of the second one-way clutch.

2. The disconnecting differential according to claim 1, wherein
   the interruption section comprises a push-pull body, a plurality of push-pull pins and an elastic member, wherein the push-pull body is ring-shaped, the push-pull body is arranged on an outer periphery of a shaft hole of the differential housing in an axially movable manner, the differential housing is provided with a plurality of holes configured to be in one-to-one correspondence with all of the rolling elements, each of the push-pull pins is arranged on the side of the push-pull body facing the second one-way clutch and is inserted into a respective hole in one-to-one correspondence, and the elastic member is arranged between the differential housing and the push-pull body;
   the power section is configured to push the push-pull body to move in a direction of the second one-way clutch, such that each of the push-pull pins shifts a respective rolling element in one-to-one correspondence, the second one-way clutch slips in the forward rotation coasting condition so as to release the locking function of the second one-way clutch, and the elastic member is compressed; and when the deformation of the elastic member is restored, the push-pull body moves in a direction away from the second one-way clutch under the action of the elastic member, such that each of the push-pull pins is disengaged from a respective rolling element in one-to-one correspondence to release the shifting of all of the rolling elements, so as to restore the locking function of the second one-way clutch.

3. The disconnecting differential according to claim 2, wherein
the power section comprises an electromagnetic coil, and the push-pull body is made of an armature material and is arranged between the electromagnetic coil and the differential housing;
wherein when the electromagnetic coil is energized, a repulsive force is generated between the electromagnetic coil and the push-pull body, such that the push-pull body moves in the direction of the second one-way clutch, and the elastic member is compressed.

4. The disconnecting differential according to claim 3, wherein
the electromagnetic coil is fixed to an inner wall of a reduction gearbox.

5. The disconnecting differential according to claim 3, wherein
a ring-shaped flange is formed on the outer periphery of the shaft hole of the differential housing, and the push-pull body is sleeved on an outer side wall of the ring-shaped flange in an axially movable manner.

6. The disconnecting differential according to claim 2, wherein
the elastic member is a disc-shaped return spring or a helical compression spring.

7. The disconnecting differential according to claim 1, wherein
the first one-way clutch is a cylinder-type one-way clutch or a wedge-type one-way clutch; and/or
the second one-way clutch is a cylinder-type one-way clutch or a wedge-type one-way clutch.

8. The disconnecting differential according to claim 1, wherein
the differential housing comprises a left differential housing and a right differential housing, and the left differential housing and the right differential housing are welded to each other.

9. The disconnecting differential according to claim 8, wherein
a main reduction gear of the disconnecting differential is welded or bolted to or is formed integrally with the left differential housing or the right differential housing.

10. An electric drive transmission system, wherein
the electric drive transmission system comprises a disconnecting differential of claim 1.

* * * * *